April 25, 1967 A. BOSCHI ET AL 3,315,951
COMPRESSION SPRINGS OF RUBBER
Filed April 6, 1965 5 Sheets-Sheet 1
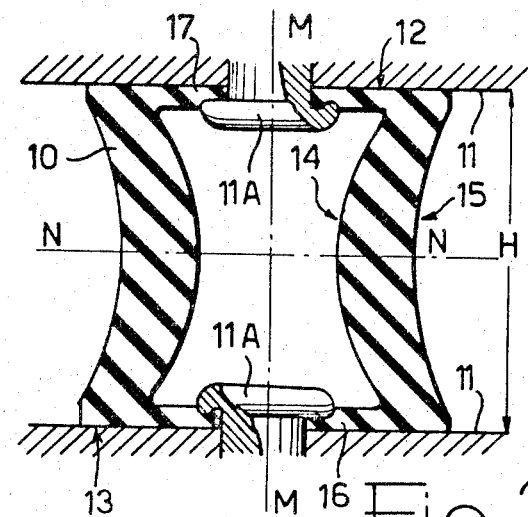
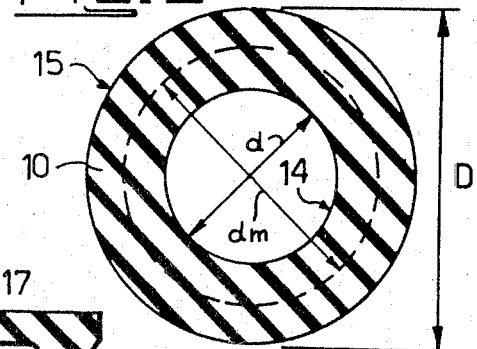
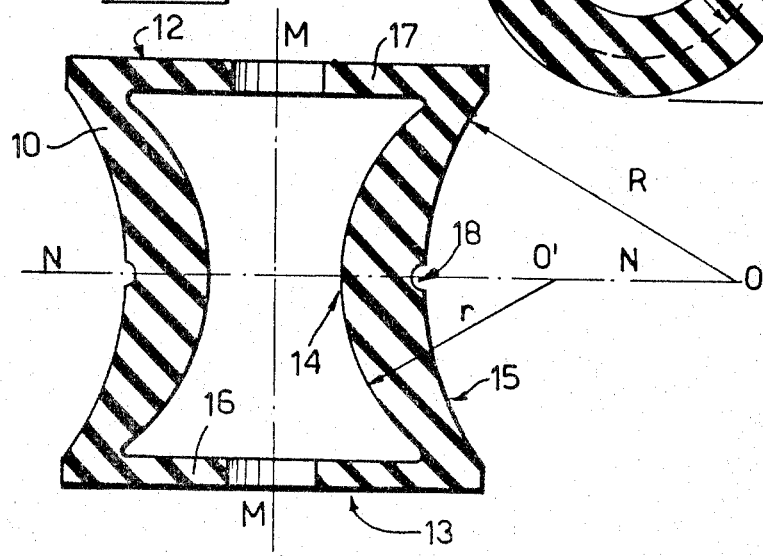

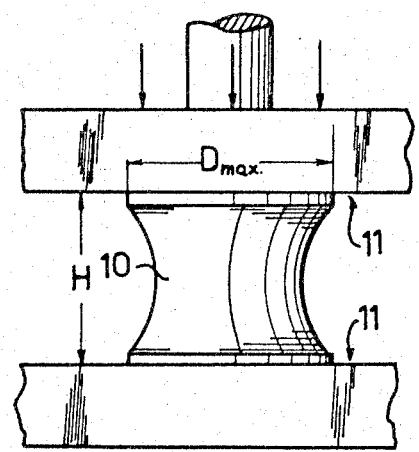
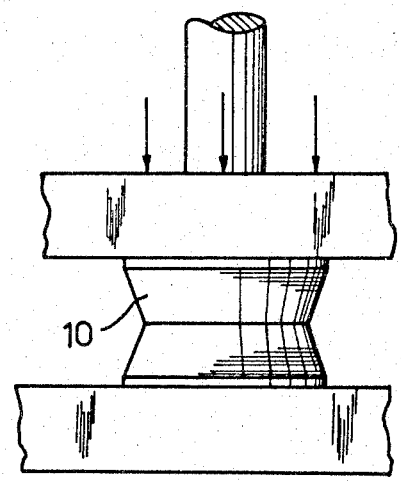
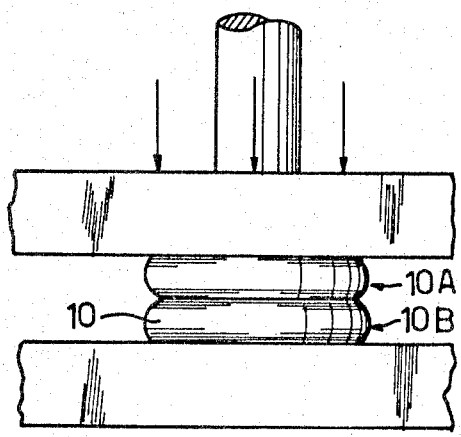
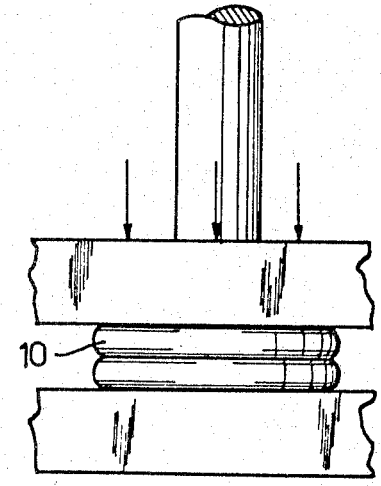

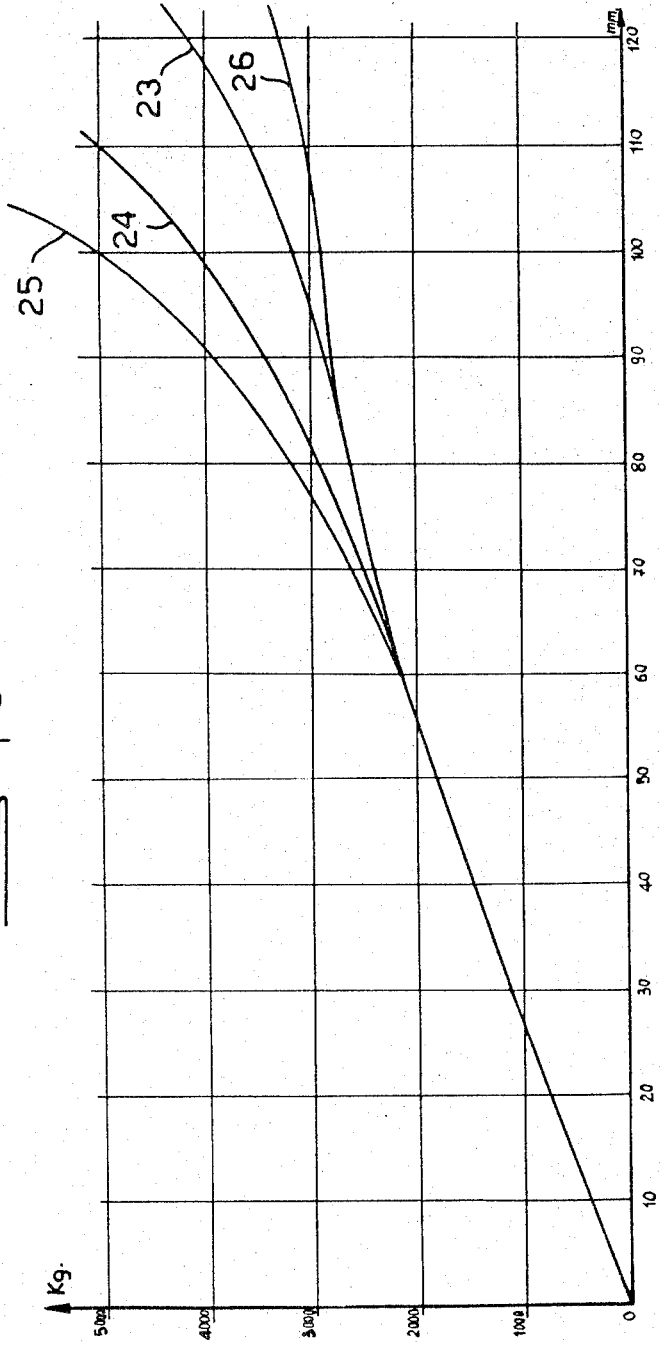

3,315,951
COMPRESSION SPRINGS OF RUBBER
Antonio Boschi and Giovanni Martorana, both of Milan, Italy, assignors to Societa Applicazioni Gomma Antivibranti "SAGA" S.p.A., Milan Italy
Filed Apr. 6, 1965, Ser. No. 445,884
Claims priority, application Italy, Apr. 11, 1964, 7,861/64; Jan. 16, 1965, 822/65
7 Claims. (Cl. 267—1)

This invention relates to compression springs of rubber or similar elastomeric material.

As compared with metal springs, e.g., helical springs, compression springs of rubber offer several advantages, resulting inter alia from the hysteresis work of the material. However, rubber deforms at constant volume; in other words, in a solid of rubber subjected to a compression load the reduction in volume due to deflection of the solid in the direction of the load must be compensated by a corresponding expansion of the solid transversely of the said direction. Thus, a highly flexible compression spring of rubber requires a substantial free space around it allowing for the necessary lateral expansion. Unfortunately, such a free space is not always available in practice.

On the other hand, highly flexible compression springs of rubber are generally unstable in transverse direction.

The objects of this invention is to provide a highly flexible compression spring of rubber capable of overcoming the above-mentioned drawbacks. Further objects and advantages will be evident from the following description.

The compression spring according to this invention essentially consists of a tubular body of a resilient elastomeric material of a general form of "diabolo," including a pair of substantially planar mutually parallel end faces and having its lateral wall defined by a pair of surfaces of revolution having a common axis perpendicular to said end faces, whereby the cross-sections of said body within the axial length of said wall are constituted by circular rings, said surfaces of revolution being generated by a pair of co-planar generatrices and the mean-diameter of said annular rings decreasing from the cross-sections taken at the ends of the wall towards the cross-section taken on the transverse mid-plane of the body, while at the same time the thickness of said wall increases from the end cross-sections towards the mid-plane cross-section.

According to a specific aspect of the invention, said pair of generatrices consists of a pair of arcs of circles having their centres distinct from each other and located on said mid-plane, the radius of the generatrix of the inner surface of the wall being smaller than the radius of the generatrix of the outer surface of the wall.

According to an alternative aspect of the invention, said pair of generatrices consists of a pair of polygonal curves, each of which is symmetrical with respect to the said mid-plane and has its convexity turned towards said axis. Each of said polygonal curves can merely consist of a pair of rectilinear segments.

In the accompanying drawings:

FIGURE 1 is an axial sectional view of a spring according to the invention in uncompressed condition;

FIGURE 2 is a cross-sectional view of the lateral wall of the spring of FIG. 1 on a plane perpendicular to the axis of the spring;

FIGURES 5 through 8 are lateral views of four configurations consecutively taken by the spring of FIG. 1 under increasing loads;

FIGURE 9 is an axial sectional view of a modification of FIG. 1;

FIGURE 16 is a load-deflection diagram referring to the embodiments shown in FIGS. 11–14.

Figure 3:
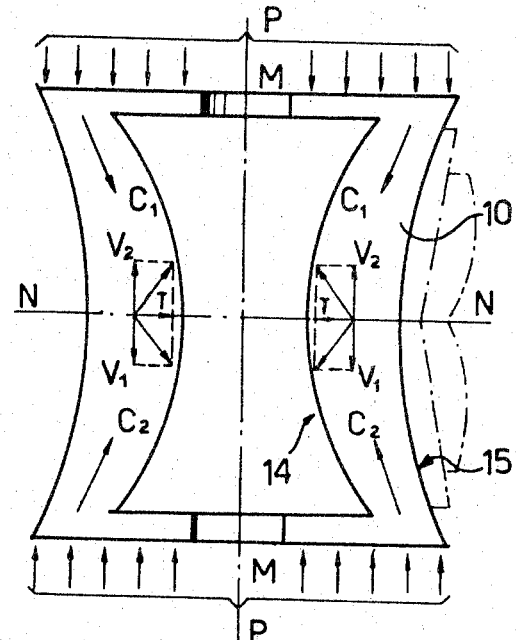
FIGURE 3 is an axial sectional view depicting the distribution of efforts in a spring according to FIG. 1 when subjected to axial compression load.
Figure 4:
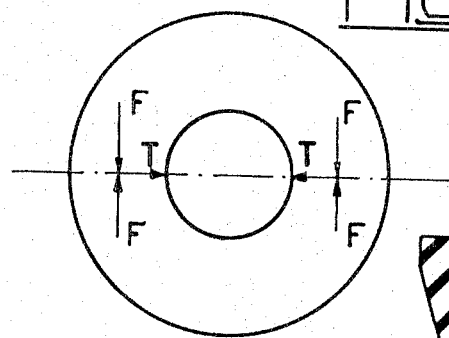
FIGURE 4 is a cross-sectional view taken on the mid-plane N—N of FIG. 3.

The spring shown in FIGURES 1 through 9 comprises a tubular thick-walled body 10 of rubber or similar elastomeric material positioned between a pair of rigid surfaces 11, 11, arranged to impose axial loads on the spring. For attachment purposes, the body 10 is integral with a pair of relatively thin, centrally apertured end walls 16, 17, each of which is fitted to a fitting member 11A fast with the respective load-applying surface 11. The general form of the body 10 is that of "diabolo." More specifically, the wall of the body is defined by a pair of concentrical revolution-surfaces 14, 15, having a common axis M—M perpendicular to the end walls 16, 17, whereby the cross-sections of the body in locations intermediate the end walls are constituted by circular rings, such as the ring shown in FIG. 2. Each of the two surfaces of revolution 14, 15 is symmetrical with respect to the transverse mid-plane N—N of the body. The generating curves (generatrices) of the surfaces 14, 15 are co-planar with the axis M—M and consist each of an arc of circle traced from a centre located on the plane N—N. More exactly, the generatrix of the outer surface 15 has a radius R and centre O and is convex towards the axis M—M, the value of the radius R advantageously amounting to from 0.65 to 1.5 times the axial length H of the spring in uncompressed condition. Also the generatrix of the inner surface 14 is convex towards the axis M—M; however, its radius $r$ is smaller than R and its centre O' is located between the centre O and the outer surface 15, the value of $r$ advantageously amounting to from 0.7 to 0.95 times the value of R.

Thus, as will be seen in FIGURES 1 and 9, the wall thickness of the body 10 goes increasing from the opposite ends of the body towards the mid-plane N—N and the mean diameter $dm$ of the body 10 goes decreasing from the ends of the body towards the plane N—N, the mean diameter being expressed by the formula $$dm = \frac{d+D}{2}$$

wherein $d$ and $D$ are the inner and outer diameter values, respectively, relating together with $dm$ to the same cross-section (circular ring) taken anywhere within the axial length of the body 10. In other words, the mean diameter of the circular rings constituting the cross-sections of the body goes decreasing from the cross-sections taken at the ends of the body towards the cross-section taken on the mid-plane N—N.

The axial length H of the spring does preferably not exceed the 1.5 times-value of $D_{max}$, the latter being the value of the diameter D at each of the opposite ends of the body 10. Advantageously, in the embodiments shown in FIGURES 1 through 9 and 10, the length H is from 0.8 to 1.1 times $D_{max}$.

The only structural difference between the embodiment shown in FIG. 1 and the modification shown in FIG. 9 resides in a circumferential groove 18 (FIG. 9) formed in the outer surface of the body 10 at the mid-plane N—N; the purpose of said groove will be explained hereinafter.

In operation, the spring is axially compressed by loads applied thereto by the surfaces 11, 11. Said surfaces are generally both perpendicular to the axis M—M of the spring; however, small dihedral angles up to about 15–20° between said surfaces 11, 11 are tollerated by the spring, especially when said angles go decreasing on compression (as in independent spring suspensions for vehicles, for example). The configurations of the spring under increasing axial loads are shown by way of example in FIGURES 6, 7 and 8, showing deflections by 20%, 40% and 50%, respectively, referred to the length H in uncompressed condition (FIG. 5). The data of the spring in uncompressed condition were as follows:

$$H = 0.8 \ D_{max.}; \quad R = 0.75 \ H; \quad r = 0.8 \ R$$

It will be seen that at a 20% deflection (FIG. 6) the spring takes the shape of a pair of truncated cones superposed on each other by their small ends. On further compression, each cone takes the shape of a torus 10A, 10B, respectively (FIG. 7) and this shape is maintained even at a 50% deflection of the spring. In other words, the spring is "self-hooping" on its transverse mid-plane, whereby its radial expansion under increasing loads is contained within reasonable and advantageous limits. In the example shown, in the passage from the conditions of FIG. 5 to the conditions of FIG. 8 (50% deflection) the diameter $D_{max.}$ increases by about 17% only of its original value; at the same time the transverse mid-section of the spring expands by about 34% of its original diameter, thereby assuring a progressively increasing mutual "seating" area for the two tori 10A, 10B, which is obviously advantageous for the transverse stability of the spring.

The self-hooping effect on the transverse mid-plane is enhanced by the circumferential groove 18 (FIG. 9).

A skillful comparison of FIG. 1 (or FIG. 9) with FIGURES 5 through 8 immediately shows that the wall of the body 10 is stressed to compression, as opposed to flexure. This behaviour of the spring appears to derive from the following processes.

An axial load P (FIG. 3) gives rise within the wall of the body 10 to oblique compression stresses denoted by $C_1$ and $C_2$. Such stresses "meet" at the transverse mid-plane N—N and can be there decomposed into axial stresses $V_1$, $V_2$ and radial stresses T. The latter tend to reduce the bore of the body 10 in the plane N—N and, as is obvious to those skilled in the art, are opposed by the "arc effect" F (FIG. 4) due to uncompressibility of rubber. Thus, the annular ring constituting the mid-section (FIG. 4) of the spring appears to behave as a substantially rigid imaginary base-surface located on the plane N—N against which the two halves of the body 10 are axially compressed by the stress-components $V_1$, $V_2$ and expand radially outwardly to its own account. In this manner, the originally concave-profiled outer surface 15 starts straightening-up on the opposite sides of the plane N—N (FIG. 10) and, subsequently, bulging to form the tori 10A, 10B (see also the dash-and-dot lines in the right-hand part of FIG. 3) while the rubber material of the spring is working essentially to axial compression.

As a practical result, the spring of this invention shows to possess a high flexibility and exhibits a relatively flat load-deflection curve over a wide range of load values, which is advantageous in many uses. Moreover, as compared with hollow cylindrical rubber springs, for example, the spring of this invention operates successfully within as high a range of deflections as 40–50% without cracking and without requiring appreciable additional space around it to accommodate its radial expansion. Still moreover, at least with $H:D_{max.}$ ratios not exceeding 1:1, the novel spring is extremely stable transversely of its axis. The stability is increased by making the wall-thickness of the body 10 progressively increasing from the ends of the body towards the mid-plane N—N and by providing the groove 18 in the outer surface 15, substantially as exemplified on FIGS. 1, 3 and 9.

According to another aspect of this invention, the pair of curves generating the revolution-surface 14, 15 (or one of said curves) can be polygonal instead of being arcuate, provided each of said curves is symmetrical with respect to the transverse mid-plane N—N and is convex towards the axis M—M of the spring.

Figure 10:
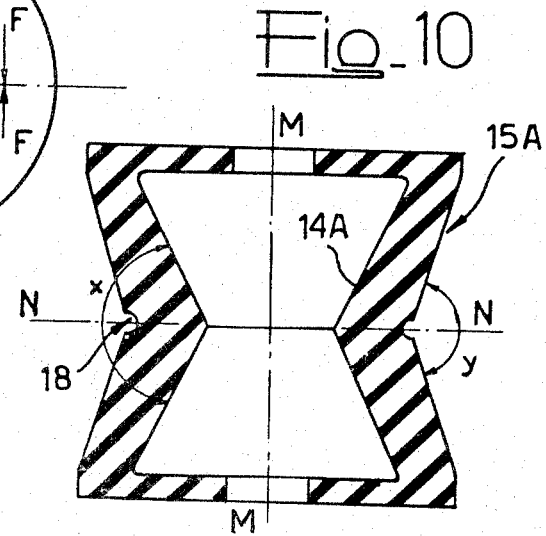
FIGURE 10 is an axial sectional view of another embodiment of this invention.

FIG. 10 shows, as a limit-embodiment of the just mentioned aspect, revolution-surfaces 14A and 15A generated by a pair of polygonal generatrices consisting each of a pair only of straight segments symmetrical with respect to the mid-plane N—N. The "curvature" of the generatrices is represented here by the angles X and Y enclosed by the segments, each of said angles being bisected by the plane N—N. It will be seen that the angle X, relating to the generatrix of the inner surface 14A, is smaller than the angle Y relating to the generatrix of the outer surface 15A (in analogy to the curvatures 1/r and 1/R, respectively, in FIG. 9), whereby the mean diameter of the spring goes decreasing from the ends thereof towards the mid-plane N—N and whereby moreover the wall-thickness goes increasing in the just specified direction. The circumferential groove 18 adds to both the transverse stability and self-hooping effect of the spring. The outer aspect of the spring of FIG. 10 is that of a pair of truncated-cones superposed on each other by their small ends; thus, in comparison with the embodiment shown in FIGS. 1–9, this spring starts forming the two tori (revert to FIG. 7) already under limited loads. Consequently, the spring exhibits a more progressive load-deflection curve and requires a somewhat greater additional lateral space for the radial expansion. The angle Y, expressed in radians, is advantageously from 2.5 to 3.0; the angle X is advantageously from 0.7 to 0.95 times the value of Y, all within the $H:D_{max.}$ ratio of from 0.8:1 to 1.5:1. However, it is to be understood (also for what regards the embodiment shown in FIGURES 1–9 and 11–15), that there is no critical lower limit for the $H:D_{max.}$ ratio; the only critical limit is the upper one, due to occasional instability of the spring under not exactly axial loads when the $H:D_{max.}$ ratio exceeds 1.1:1 and due to quite certain instability when said ratio exceeds 1.5:1, unless a rigid guide rod or tube is provided on the axis M—M in the spring cavity to maintain the mid-section of the body 10 constantly centered on said axis.

The embodiments shown in FIGS. 11–15 permit to safely adopt $H:D_{max.}$ ratios exceeding 1:1 even with not exactly axial loads. The only substantial difference between said embodiments and the embodiment described with reference to FIGS. 1–9 resides in that the body of the spring is transversely subdivided into two halves 20, 21, similar to each other, by means of a flat annular metal member 22 having said halves bonded to its opposite faces.

Figure 11:
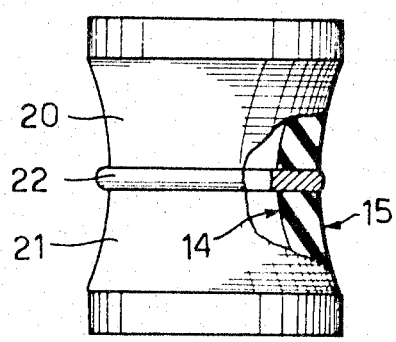
FIGURES 11 through 15 are partly broken elevational views of further five embodiments.
Figure 12:
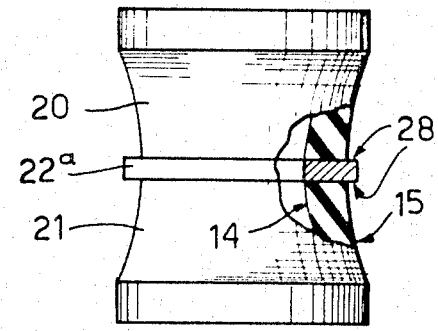

As shown in FIG. 11, the member 22 has a rounded outer circumferential edge just appearing on the outer surface of the spring. In FIG. 12, the member 22a appreciably protrudes with its planar faces beyond the outer circumferential surface 15 of the spring, thereby to provide additional planar abutment surfaces 28 for the body halves 20, 21 as the latter bulge under substantial loads imposed on the spring. It has been found that the cross-sectional shape of such additional abutment surfaces is capable of modifying within some limits the load-deflection curve of the spring. Curve 23 in FIG. 16 depicts the properties of a spring constructed according to the embodiment shown in FIG. 11. Curve 24 relates to a spring of the character shown in FIG. 12; it will be seen that the additional planar abutment surfaces 28 exert a stiffening action in the high-load range.

Figure 13:
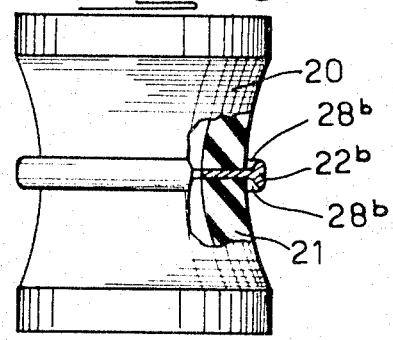

In the embodiment shown in FIG. 13 the additional abutment surfaces 28b on the projecting part of the annular member 22b are concave towards their respective body halves 20, 21, so that the otherwise flat member 22b comprises a circumferential bead defined by said surfaces; the load-deflection curve of this spring is denoted by 25 in FIG. 16. It will be seen that, in the high-load range, curve 25 is steeper than curve 24.

Figure 14:
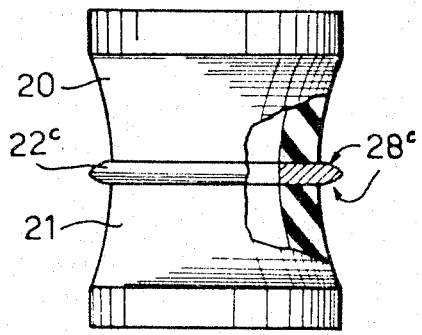
Figure 15:
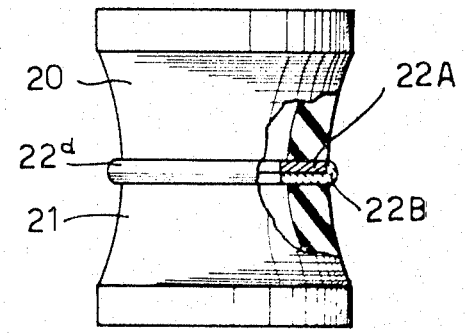

In the embodiment shown in FIG. 14 the additional abutment surfaces on the projecting part of the annular member 22c consist of convexly arcuate chamfers 28c on the outer circumference of the member; the load-deflection curve of this embodiment is denoted by 26 in FIG. 16.

The outer diameter of the flat annular metal member is advantageously kept within the value of $D_{max}$. Moreover, if desired or necessary, a sectional member can be adopted in lieu of the single-piece member shown in FIGS. 11-14. Such a sectional member is denoted by 22d in FIG. 15 and comprises a pair of superposed flat annular rings 22A, 22B, of rigid material (e.g., steel), one of which is formed with a circumferential centering lip for the other ring. The two rings can be fastened together by any conventional means.

What we claim is:

1. A compression spring comprising a tubular body of a resilient elastomeric material, said tubular body having a pair of mutually parallel end walls and tubular lateral walls, the thickness of said tubular lateral walls continuously increasing from a minimum at each of said end walls to a maximum in a transverse plane midway of said end walls and the internal and external transverse dimensions of the tubular body each continuously decreasing from a maximum at each of said end walls to a minimum in said midway plane.

2. A compression spring according to claim 1, in which said tubular body is of circular cross-section.

3. A compression spring according to claim 2, in which said tubular lateral walls are symmetrical with respect to said midway plane.

4. A compression spring according to claim 2, in which the outer surface of said tubular walls is provided with a circumferential groove in said midway plane.

5. A compression spring according to claim 2, in which the axial length of said body is not greater than 1.5 times the maximum external diameter of said body.

6. A compression spring according to claim 2, in which the external and internal surfaces of said tubular lateral walls are defined by two surfaces of revolution having a common axis perpendicular to said end walls, said surfaces of revolution being generated by two coplanar generatrices each of which is symmetrical with respect to said midway plane and consist of an arc of a circle having its center located on said midway plane and being convex as viewed from said common axis.

7. A compression spring according to claim 2, in which the external and internal surfaces of said tubular lateral walls are defined by two surfaces of revolution having a common axis perpendicular to said end walls, said surfaces of revolution being generated by two coplanar generatrices each of which is symmetrical with respect to said midway plane and consists of a polygonal curve symmetrical with respect to said midway plane and being convex as viewed from said common axis.

References Cited by the Examiner

FOREIGN PATENTS

| | | |
|---|---|---|
| 229,187 | 7/1960 | Australia. |
| 1,157,837 | 1/1958 | France. |
| 1,276,628 | 10/1961 | France. |
| 1,283,406 | 12/1961 | France. |

ARTHUR L. LA POINT, *Primary Examiner.*

R. M. WOHLFARTH, *Assistant Examiner.*